(12) United States Patent
Juhojuntti

(10) Patent No.: US 7,905,024 B2
(45) Date of Patent: Mar. 15, 2011

(54) DRIVE WHEEL

(75) Inventor: Stigbjorn Juhojuntti, Bohus (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 12/348,871

(22) Filed: Jan. 5, 2009

(65) Prior Publication Data

US 2009/0106987 A1    Apr. 30, 2009

Related U.S. Application Data

(63) Continuation of application No. 10/906,316, filed on Feb. 14, 2005, now abandoned, which is a continuation-in-part of application No. PCT/SE03/01163, filed on Jul. 4, 2003.

(30) Foreign Application Priority Data

Aug. 14, 2002   (SE) ...................... 0202414

(51) Int. Cl.
    *B23D 45/16*    (2006.01)
(52) U.S. Cl. ............................... 30/388; 30/389; 30/276
(58) Field of Classification Search .............. 30/388, 30/389, 276
    See application file for complete search history.

(56) References Cited

U.S. PATENT DOCUMENTS

| 1,682,268 | A |   | 8/1928  | Davey et al. |
| 3,844,729 | A | * | 10/1974 | Sedlatschek et al. ......... 428/560 |
| 4,472,880 | A | * | 9/1984  | Johansson ....................... 30/389 |
| 4,646,607 | A | * | 3/1987  | Johansson ....................... 83/853 |
| 4,776,137 | A | * | 10/1988 | Loos et al. ...................... 451/47 |
| 4,793,065 | A | * | 12/1988 | Johansson ....................... 30/389 |
| 4,934,238 | A | * | 6/1990  | Lauffer .......................... 83/666 |
| 5,009,011 | A |   | 4/1991  | Johansson |
| 6,243,956 | B1 | * | 6/2001 | Nilsson et al. .................. 30/389 |
| 6,374,501 | B1 |   | 4/2002 | Claesson |
| 6,591,725 | B1 | * | 7/2003 | Martin ........................ 83/471.3 |

* cited by examiner

*Primary Examiner* — Maurina Rachuba
(74) *Attorney, Agent, or Firm* — Novak Druce + Quigg LLP

(57) ABSTRACT

A drive wheel for centerless drive of an annular saw blade of a cutting machine. The drive wheel includes a drive ring having concentrically arranged first and second annular elements, each of which has a first beveled side surface located radially outward from a second beveled side surface. The second beveled side surfaces are in contact with one another and the first beveled side surfaces together define a wedge-shaped drive groove for the inner edge of an annular saw blade that is to be driven by the drive ring. Third and fourth annular elements are arranged concentrically with, and outboard to the first and second annular elements located therebetween. The third and fourth annular elements are configured to inwardly compress upon the first and second annular elements. An anti-relative-rotation member interconnects the first and second annular elements to prevent relative rotation therebetween while driving the annular saw blade of a cutting machine.

16 Claims, 6 Drawing Sheets

DRIVE WHEEL

CROSS-REFERENCE TO RELATED APPLICATIONS

The present application is a continuation of U.S. application Ser. No. 10/906,316 filed 14 Feb. 2005, which is a continuation-in-part application of International Application No. PCT/SE03/01163 filed 4 Jul. 2003 which was published in English pursuant to Article 21(2) of the Patent Cooperation Treaty, and which claims priority to Swedish Application No. 0202414-9 filed 14 Aug. 2002. Said applications are expressly incorporated herein by reference in their entireties.

TECHNICAL FIELD

The invention concerns a drive wheel that is used for driving an annular saw blade in a cutting machine. The drive wheel includes first and second annular elements that are concentric, and each has a first annular bevelled surface and a second annular surface inside of the bevelled surface relative to the radial direction. When the annular elements are associated together in the drive wheel, the bevelled surfaces define a wedge-shaped drive-groove therebetween for receiving the inner edge of the saw blade.

BACKGROUND OF THE INVENTION

Drive wheels of the type referred to above are known, for example, through U.S. Pat. No. 4,472,880 and have greatly contributed to the technical and commercial breakthrough of so called ring saws which are cutting machines having annular saw blades. This, however, does not mean that the drive of such annular saw blades has been problem-free. One such problem stems from the fact that in order for the drive between the drive wheel and the saw blade to be efficient, the bevelled surfaces that define the wedge-shaped drive-groove must bear with adequate pressure on the wedge-shaped inner edge of the saw blade. According to U.S. Pat. No. 4,472,880, this pressure is provided by causing the first annular surfaces of the annular elements to be pressed against the wedge-shaped edge of the saw blade. In practice, it has turned out that the pressure force required to provide a contact pressure sufficient for an efficient drive must be so great that it has caused severe problems, including great wear upon the saw blade, as well as of the drive wheel, which in turn has reduced the service life of these machine elements.

It is suggested in U.S. Pat. No. 4,793,065 that the wedge-shaped edge of the saw blade can be pressed in the radial direction into the drive-groove of the drive-wheel. Those parts of the drive wheel which between them define the wedge-shaped drive wheel are designed to be stationary relative to each other. This principle has turned out to give a better drive than that one which is based on pressing in the axial direction according to U.S. Pat. No. 4,472,880. However, in this case the walls of the wedge-shaped drive-groove are also subjected to heavy wear. This problem can be addressed by manufacturing the drive wheel of a more wear resistant material, but this solution can be very expensive.

According to U.S. Pat. No. 6,243,956, only a minor part of the drive wheel is made of a wear resistant material, while the rest of the drive wheel is made of conventional structural steel. The annular drive ring shown in the '956 patent, however, is difficult to manufacture, independent of the material used in its construction. The drive ring cannot, for example, because of its geometry, be manufactured through cold forging even if the material is a conventional structural steel; a feature which is desirable since cold forging is a simple manufacturing technique that can make the product cheaper. Even more difficult would the manufacturing be if the drive ring shall be made of a more qualified material. This is particularly true if it shall be made of a very wear resistant material, such as a sintered carbide material or a wear resistant ceramic material because of the difficulties in machining such materials by means of cutting tools.

Further, it is particularly difficult to establish the drive-groove, and especially the annular recess which should exist in the bottom of the wedge-shaped groove in order to prevent the wedge-shaped edge of the saw blade from reaching the bottom of the wedge-shaped groove, since that would severely impair the driving efficiency of the drive wheel and also increase the wear of the drive ring as well as of the saw blade.

SUMMARY OF THE INVENTION

It is an object of the invention to address the above complex of problems. More particularly, the invention aims to provide a drive wheel that has good drive performance and which can be manufactured in a way which is favourable from an economic point of view.

The invention is characterized, at least in part by the fact that second annular surfaces are in snug contact with each other, and that the drive wheel also comprises (includes, but is not necessarily limited to) a third and fourth annular element. The third and fourth annular elements are concentric with the first and second annular elements and are provided on each side of the first and second annular elements in order to press thereagainst. Preferably, the second annular surfaces are flat.

According to one aspect of the invention, an aim is to provide a drive wheel, those parts of which are subjected to wear have a good wear resistance. According to this aspect of the invention, the first and second annular elements consist of a material which has a better wear resistance than the third and fourth annular elements. For example, the first and second annular elements may consist of any of those wear resistant materials which include cemented carbide materials, ceramic materials, and high speed steels.

According to another aspect of the invention, it is a purpose to provide a drive wheel which can be produced in a way that is favorable from an economic point of view. The invention according to this aspect of the invention is characterized in that the first and second annular elements consist of a material that can be cold forged, for example from structural steel.

According to still another aspect of the invention, the first and second annular elements have, between the first and second annular surfaces, a third annular surface, such that the third annular surfaces between them define a narrow recess, which extends in the radial direction, inwards into the drive wheel. Preferably, the narrow recess has flat, or at least essentially flat side walls, and is 0.5-1.5 times deeper than the wedge-shaped groove. According to one more aspect of the invention, means are provided for preventing any rotation of the first, second, third, and fourth annular elements relative to each other about the center of rotation of the drive wheel. These means can be designed in different ways such as splines, non-round form locks, and other geometric locks that prevent relative rotation, including one or more wedge locks and the like. According to at least one embodiment, such a drive wheel may include at least one element, here referred to as anti-relative-rotation member, that extends in the axial direction through apertures or recesses in the first and second annular elements inside of the drive-groove with reference to the radial direction. Preferably they also, according to the embodiment, extend into or through apertures or recesses in the third and fourth annular elements. The anti-relative-rotation member or members may consist of one or more elements of the type of elements which include pins, tubular pins, and rods.

According to a further aspect of the invention, the first and second annular elements are designed as drive ring halves having identically equal shape, which promotes easy manufacture and can be invertedly mounted with respect to one another to form the drive wheel. It should be appreciated, however, that the first and second annular elements need not necessarily be identical.

Further aspects of the invention will be apparent from the claims and from the detailed description of the invention provided hereinbelow.

BRIEF DESCRIPTION OF THE DRAWING

In the following, detailed description is provided of embodiments of the presently disclosed invention. In that regard, reference is made to the accompanying drawings in which.

DETAILED DESCRIPTION

Figure 1:
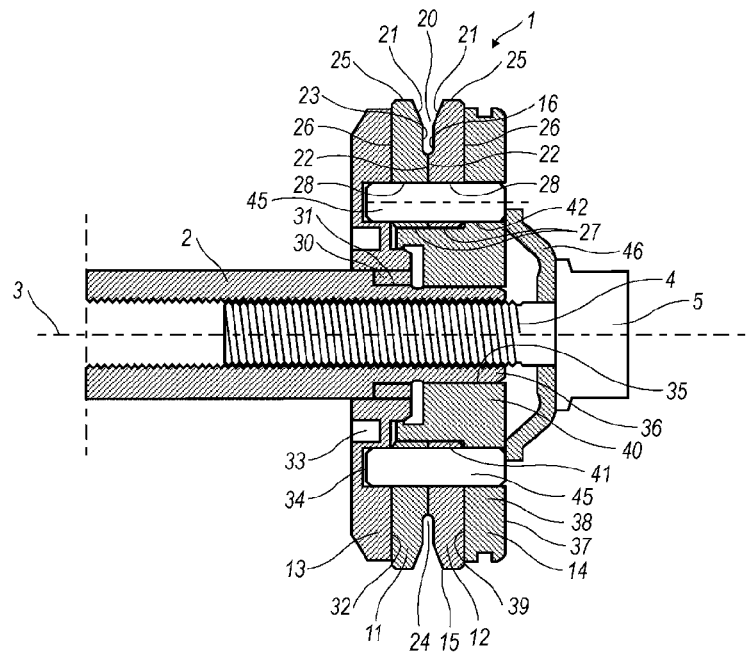
FIG. 1 is a cross-sectional view of a drive wheel configured according to the teachings of the present invention and that is mounted on a drive shaft.

Referring to FIG. 1, a cross-sectional view is provided of a drive wheel 1 mounted on a drive shaft 2. The drive shaft 2 can be rotated about its center of rotation 3 by means of a hydraulic, pneumatic or electric motor, or by a combustion engine via a suitable power transmission such as a belt-transmission. In this connection, reference may be made to U.S. Pat. No. 6,374,501 that shows a belt-transmission from a combustion engine. In this case a belt pulley is mounted on the drive shaft. The drive shaft 2 is tubular and is internally provided with threads that cooperate with the threads of a screw. In FIG. 1 of the present application, a screw head 5 is provided for clamping the drive wheel 1 on the shaft 2. As an alternative, the drive wheel 1 can also be mounted directly on the driving shaft of a hydraulic motor as is shown, for example, in U.S. Pat. No. 6,243,956. In that case, the drive shaft is suitably homogeneous and may be provided with a threaded hole for a clamping screw in its front end, or be provided with external threads in its front end for cooperation with a clamping nut. Although the drive of the drive shaft does not form part of the present invention, reference is also made to U.S. Pat. No. 6,374,501 and U.S. Pat. No. 6,243,956 regarding the drive of drive shaft 2 and in turn the drive wheel 1; the disclosures of said US patents are expressly incorporated herein for description purposes.

The drive wheel 1 comprises four annular elements, namely a first annular element 11, a second annular element 12, a third annular element 13, and a fourth annular element 14.

In the following, these annular elements will also be referred to as inner drive ring half 11, outer drive ring half 12, follower plate 13, and clamping plate 14. No restrictive meaning shall, however, be attributed to the chosen terminology for these four elements. The drive ring halves 11 and 12 are constructed from a highly wear resistant material, and preferably a sintered carbide material or a ceramic material. The follower plate 13 and the clamping plate 14 are advantageously made of conventional structural steel. It should also be appreciated that the drive ring halves 11 and 12 will typically also consist of conventional structural steel where such high wear resistance is not required. Because of the geometric design of the drive ring halves, it is possible to manufacture them using cold forging to ready, or near ready shape when the material consists of a conventional structural steel. In this case, the drive ring will be a comparatively cheap replacement part of the drive wheel.

According to at least one preferred embodiment, the two drive ring halves have identically equal design, but are invertedly mounted as shown in FIG. 1. In that embodiment, the sides of the drive ring halves 11, 12 facing each other have a first annular surface 21 that is bevelled in the way shown in the Figure. That is, the bevelled surfaces 21 together form a circumferential, wedge-shaped groove 20 matching the wedge-shaped edge of an annular saw blade that has a wedge-shaped drive edge. Inside the first bevelled surface 21 (with reference to the radial direction), and at a distance from the surface, each drive ring half 11, 12 has a second, annular surface 22, that is preferably flat.

These second annular surfaces 22 are in snug and unresilient contact with each other so that the two drive ring halves 11 and 12 in combination form a drive ring 15 having a wedge-shaped groove 20 with a width that does not change except from the wear of the groove which may occur during use.

Between the first and second annular surfaces 21, 22, each drive ring half 11, 12 has a third annular surface 23 which is flat except in the region adjacent to the outer border line of the second annular surface where it is rounded as is shown in FIG. 1.

Between the third annular surfaces 23, an annular recess 24 is formed having flat side walls and a rounded bottom. This recess 24 extends from the first annular surfaces 21, and thence from the wedge-shaped groove 20, inwards in the radial direction to a depth which approximately corresponds to the depth of the wedge-shaped groove 20. The purpose of this inner recess 24 is to prevent the wedge-shaped edge of the saw blade from touching the bottom of the wedge-shaped groove 20 as the edge of the saw blade and/or the wedge-shaped groove successively is/are being worn. The width of the annular recess 24 is about 1.5 mm, while the depth is substantially larger, or about 4 mm.

A recess having these dimensions is very difficult, if not impossible to establish through the employment of conventional manufacturing techniques used for items constructed from sintered carbide or ceramic material. Also, the wedge-shaped groove 20 would be difficult to establish if the drive ring 15 were homogenous. Because the drive ring 15 consists of two identical halves, however, the desired contour of the drive ring can be established by forming and possibly machining the drive ring halves before they are brought together to define an integrated drive ring 15. This is true regardless of whether the drive ring halves are made of a conventional structural steel or other suitable material that can be cold forged, or are made of a more qualified, wear resistant material. Also, drive ring halves made from more ordinary structural steel and that are subjected to high-wear conditions can be provided with a coating of a more wear resistant material, for example titanium carbide or titanium nitride at wear surface.

The other surfaces of the drive ring halves 11, 12 are less complex and comprise an outer cylindrical surface 25, an annular, flat outer side 26, and an inner cylindrical surface 27. According to the embodiment of FIG. 1, each drive ring half 11, 12 also comprises two cylindrical through apertures 28 that are located diametrically opposite each other and extend in the axial direction between the second annular surface 22 and the flat outer side 26 at a short distance from the inner cylindrical surface 27.

The follower plate 13 is provided in the region of an inner part thereof with a flange-shaped portion 30 having a flat surface that fits a correspondingly designed surface 31 on the drive shaft. The surface 31 on the drive shaft 2 works as a follower member in cooperation with the flange-shaped portion 30 for the rotation of the follower plate 13 when the drive shaft 2 is rotated about its center of rotation 3. The follower plate 13 extends from the flange shaped portion 30 outwards in the radial direction to near the outer cylindrical surface 25 of the inner drive ring half 11. The side 32, which faces the inner drive ring half 11, is flat and contacts the flat outer side 26 of the drive ring half 11.

An annular recess 33 on the outer side of the follower plate is provided as a sealing collar. The follower plate 13 also is provided with two diametrically located holes 34 on the side facing the drive ring half 11, which holes 34 extend from the flat side 32 of the follower plate in the axial direction to a depth corresponding to approximately two thirds the thickness of the follower plate 13. The holes 34 are located in line with the through apertures 28 of the drive ring halves 11 and 12. The clamping plate 14 has a central, cylindrical through hole 35, corresponding to the shape of the outermost portion 36 of the drive shaft 2. The clamping plate 14 is mounted for a snug fit on the end portion 36 of the drive shaft 2.

The outer side 37 of the clamping plate 14 is essentially flat. A peripheral portion 38 of the clamping plate extends to near the outer, cylindrical surface 25 of the outer drive ring half 12. The inner side 39 of this portion is also flat and contacts the flat outer side 26 of the outer drive ring half. The peripheral portion may be termed wheel disc and the inner part of the clamping plate 14 may be termed hub portion. These terms shall not be given any restrictive meaning. The hub portion has an outer, cylindrical surface 41, which the inner, cylindrical surfaces 27 of the two drive ring halves are in contact in a snug fit.

Two cylindrical through holes 42 are provided in the clamping plate 14, the holes 42 having the same diameter as the holes 28 in the drive ring halves and as the not through hole 34 in the follower plate 13. The holes 42 are located in line with the other holes. A tubular pin 45 extends through each of the holes 42 and 28, which are in line with each other, and it also extends into the hole or recess 34 in the follower plate 13.

The tubular pins 45 have two functions; first, when mounted in the holes 42, 28 and 34 in the clamping plate 14, the drive ring halves 12 and 11, and the follower plate 13, the pins 45 prevent relative rotation between the elements. In this regard, the pins and similarly functioning members and assemblies are referred to as "anti-relative-rotation" means or members. In a second aspect, the tubular pins 45, when mounted in the respective holes, also function as follower members for transmitting the rotational movement of the follower plate to the drive ring halves 11 and 12 and to the clamping plate 14.

The tubular pins 45 are retained by means of a spring washer 46, which by means of the screw head 5 is pressed against the outer side 37 of the clamping plate 14 when the screw 4 is tightened. In this manner the flat surfaces 22 of the drive ring halves 11 and 12 are pressed against each other and the thus integrated drive ring 15 is pressed against the follower plate 13.

FIGS. 2-7 illustrate additional embodiments of the presently disclosed invention primarily regarding alternative configurations of the anti-relative-rotation means/member 45. Therefore, like reference numerals have been utilized between the several figures indicating similar elements and features.

Figure 2:
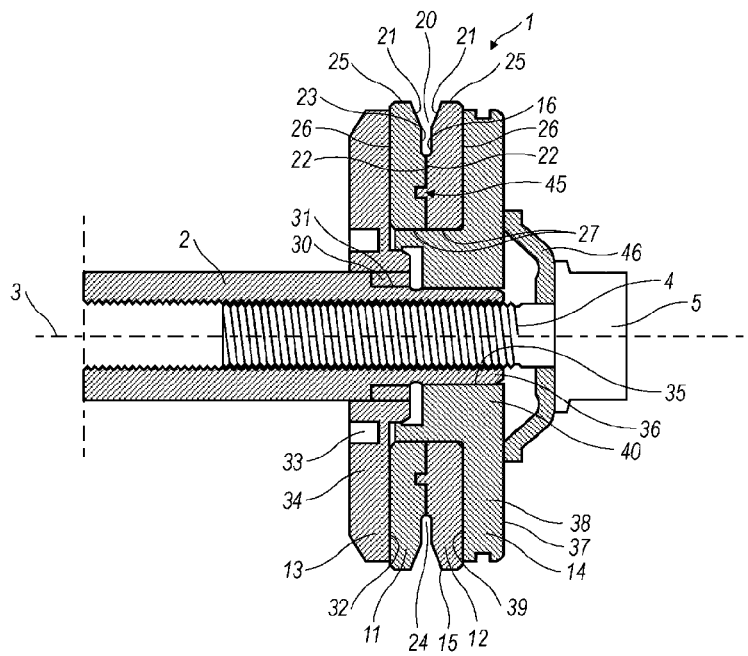
FIG. 2 is a cross-sectional view of an alternative embodiment of a drive wheel configured according to the teachings of the present invention and that is also mounted on a drive shaft.
Figure 5A:
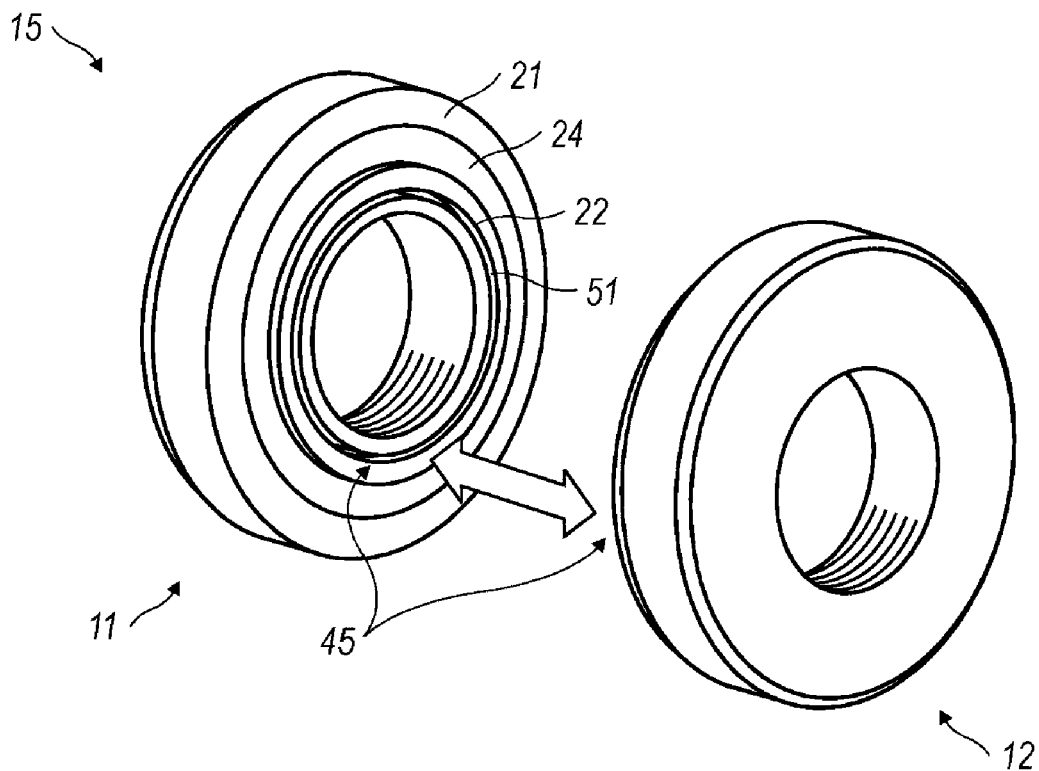
FIG. 5a is an exploded perspective view of first and second annular elements of a drive wheel showing the "groove" portion of a tongue-in-groove coupling for fixing relative rotation between the two elements.
Figure 5B:
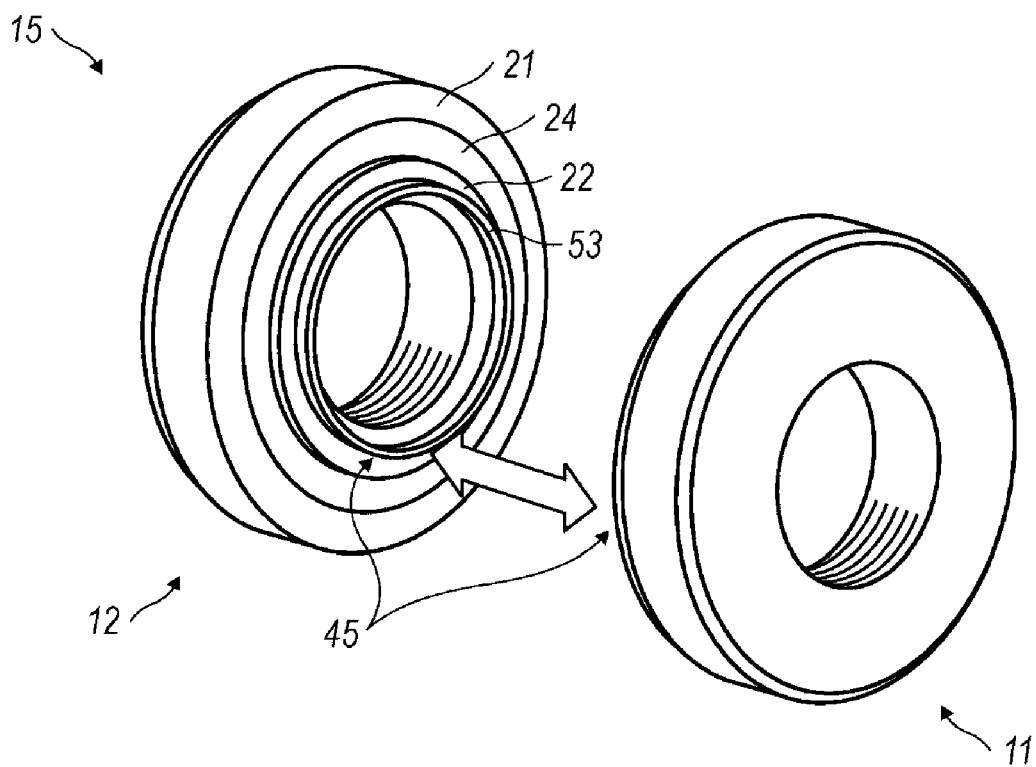
FIG. 5b is a complementary exploded perspective view of the first and second annular elements of FIG. 5a, but showing the "tongue" portion of the tongue-in-groove coupling.
Figure 6:
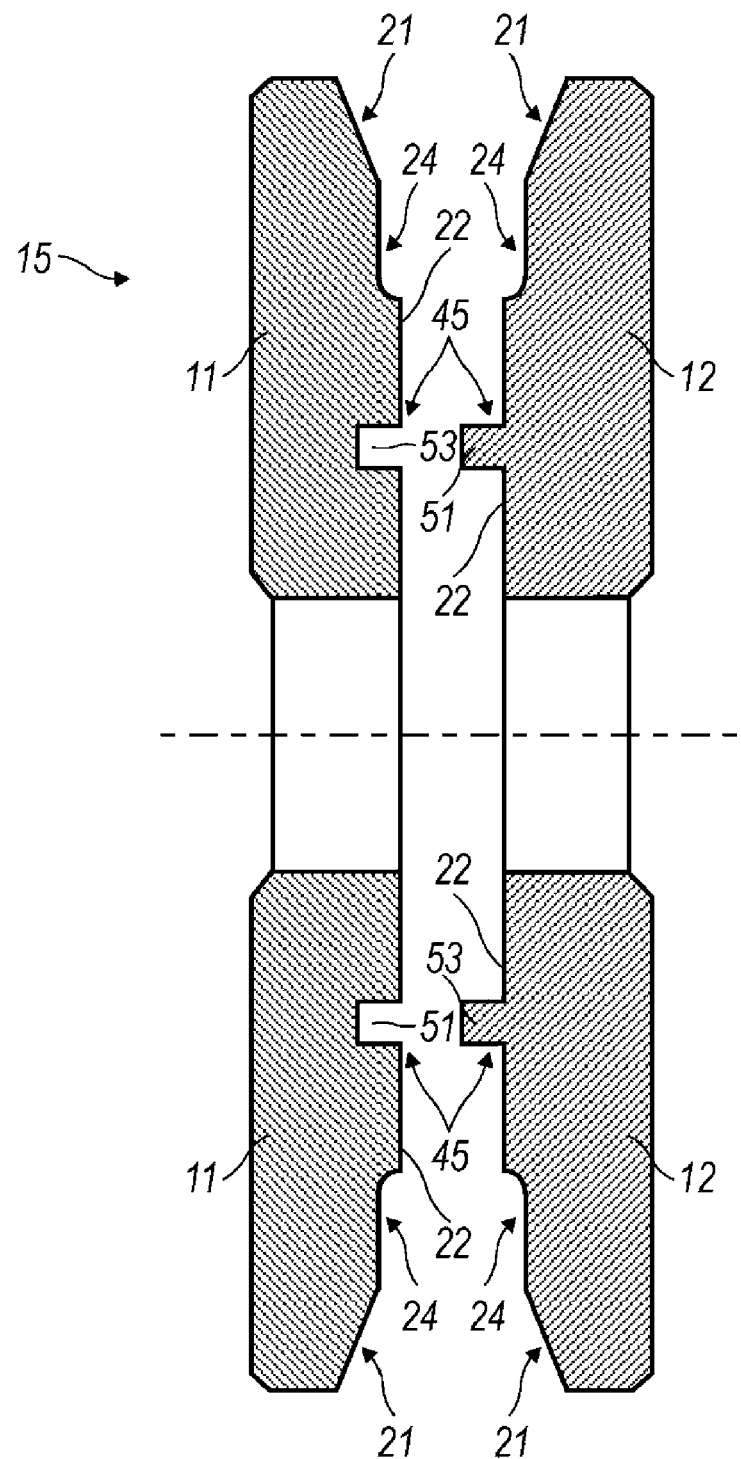
FIG. 6 is a cross-sectional view of mated first and second annular elements of FIGS. 5a and 5b.

The cross-sectional view of FIG. 2 is representative of the embodiment of the drive ring 15 depicted in FIGS. 5a, 5b and 6. As intimated above, one aspect of the present invention is to avoid relative rotation between the first and second annular elements 11, 12 that make up the drive ring 15. FIGS. 5a, 5b and 6 illustrate an example of the anti-relative-rotation means 45 being constituted by an interference fit between an annular tongue-in-groove arrangement. In this embodiment, a tongue 53 establishes a tight-interference fit in a groove 51. When mated together in this manner and establishing a unified drive ring 15, the resulting part can be viewed as a single-piece product, especially by the end user responsible for assembling the ring 15 into a drive wheel arrangement 1. FIG. 6 provides a cross-sectional view of a pair of annular elements 11, 12 including such a tongue-in-groove coupling 45 readied for mated engagement. FIG. 2 illustrates such a drive ring 15 included in an incorporating drive wheel 1.

Figure 3A:
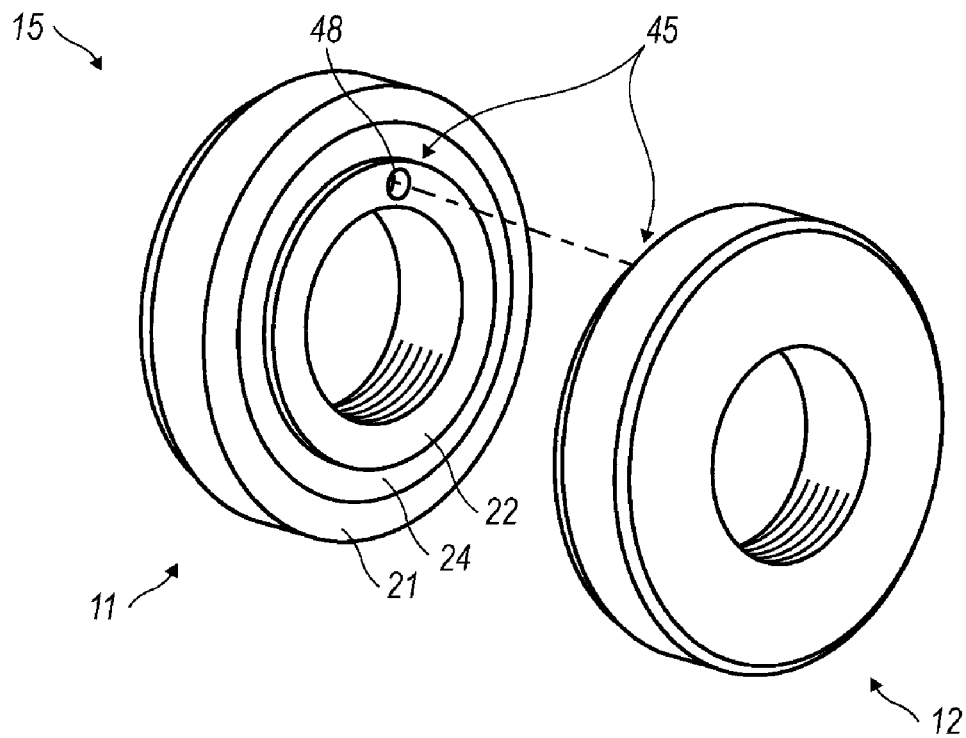
FIG. 3a is an exploded perspective view of first and second annular elements of a drive wheel showing the "hole" portion of a peg-and-hole coupling for fixing relative rotation between the two elements.
Figure 3B:
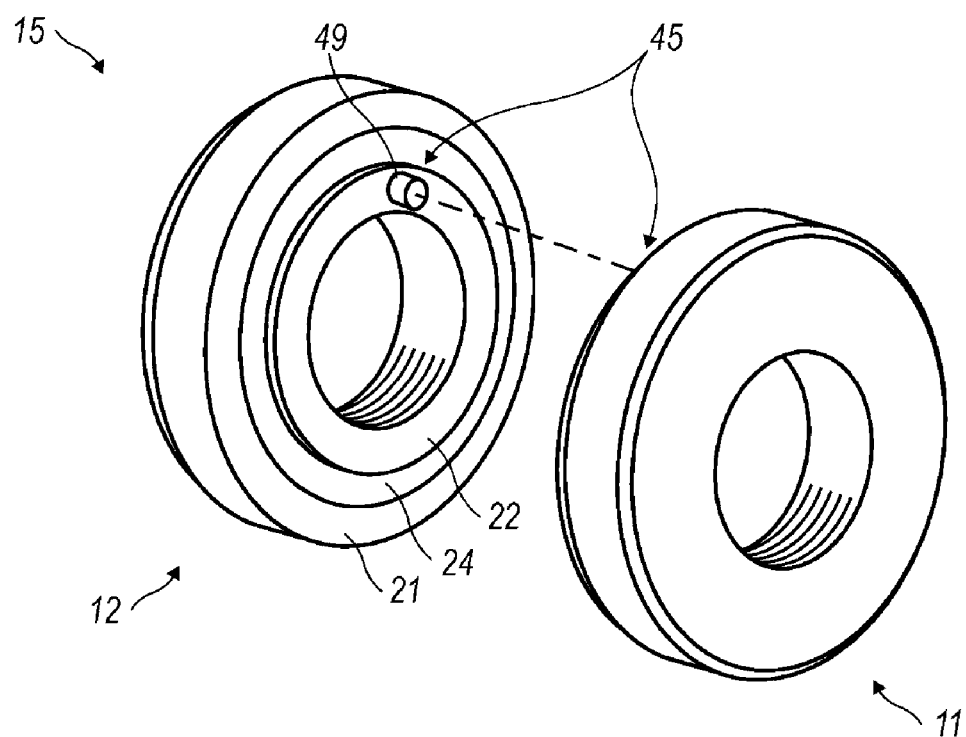
FIG. 3b is a complementary exploded perspective view of the first and second annular elements of FIG. 3a, but showing the "peg" portion of the peg-and-hole coupling.
Figure 4:
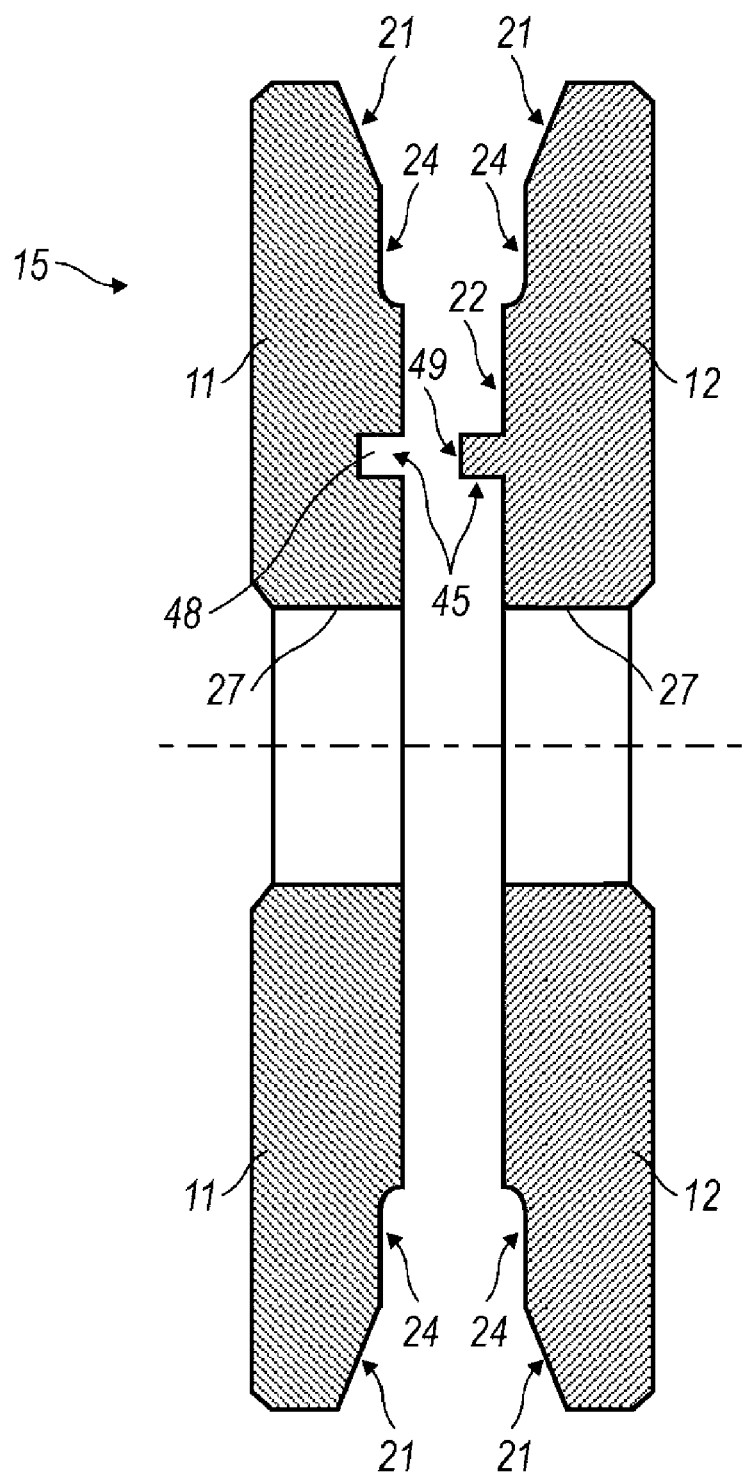
FIG. 4 is a cross-sectional view of mated first and second annular elements of FIGS. 3a and 3b.

FIGS. 3a and 3b provide two views of an alternatively configured drive ring assembly 15 taken from two appropriate perspectives demonstrating that the anti-relative-rotation means takes the form of an interference fitting peg-and-hole coupling 45. In this embodiment, the coupling includes a peg 49 carried upon the annular element 12 which is configured for a tight fit in hole 48 recessed into the annular member 11. FIG. 4 demonstrates this arrangement in a cross-sectional view.

Figure 7:
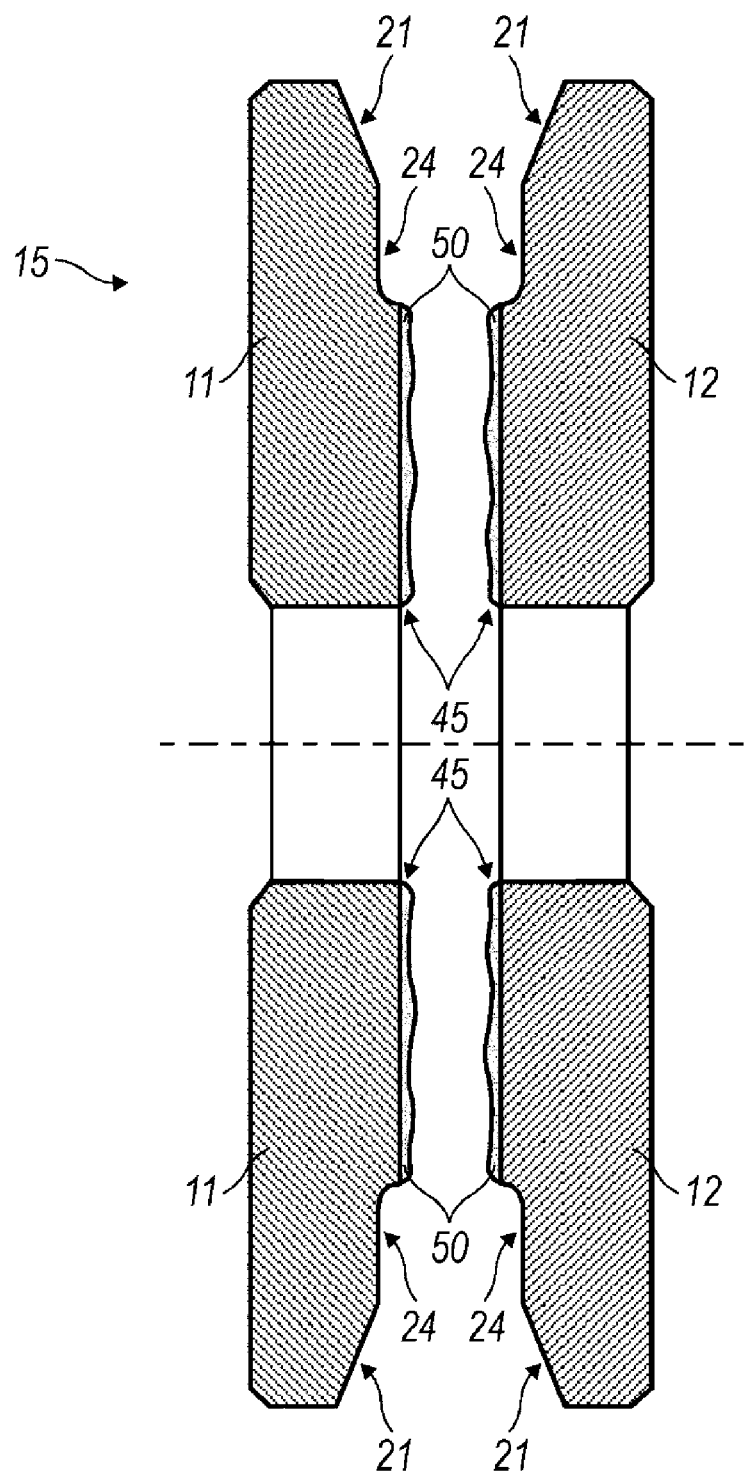
FIG. 7 is a cross-sectional view of first and second annular elements about to be mated using an adhesive therebetween.

FIG. 7 demonstrates yet a further alternative configuration of the drive ring 15 wherein two annular elements 11, 12 are arranged for anti-relative-rotation with respect to one another utilizing an adhesive 50 therebetween. It is contemplated that any suitable adhesive may be utilized to establish such an anti-relative-rotation means, and because the elements 11, 12 are suitably constructed from structural steel, particularly at the contact surfaces, soldering is considered a particularly advantageous adhesive means 50.

It should be appreciated that the anti-relative-rotation means and members 45 resist relative rotational movement between the first and second annular elements 11, 12 and resistance between the wheel halves 11, 12 is enhanced in the operative embodiment of the drive wheel 1 where the follower plate 13 and clamping plate 14 act in compression upon the drive ring 15 as depicted in FIGS. 1 and 2.

Exemplary and preferred embodiments of the presently disclosed invention have been described hereinabove; these examples and preferred configurations, however, should not be considered as limitations upon the claims which define the scope and breadth of legal protection associated therewith.

The invention claimed is:

1. A method for providing a drive wheel for centerless drive of an annular saw blade of a cutting machine, said method comprising:
providing first and second annular elements, each of said annular elements having a first, beveled side surface located radially outward from a second side surface, said second side surfaces of the first annular element and the second annular element being in contact with one another and said first beveled side surfaces of the first annular element and the second annular element together defining a wedge-shaped drive groove for an inner edge of an annular saw blade to be driven by the drive wheel, said first and second annular elements being formed of a highly wear-resistant material selected from the group consisting of sintered carbide, ceramic material, and cold-forged steel;
wherein said first beveled surfaces are coated with a wear resistant material;
providing third and fourth annular elements configured to inwardly compress upon said first and second annular elements;
providing an anti-relative-rotation member for preventing relative rotation between said first, second, third, and fourth annular elements; and
assembling the drive wheel by interconnecting said first and second annular elements with the anti-relative rotation member and thereby preventing relative rotation between said first and second annular elements when driving an annular saw blade of a cutting machine with the assembled drive wheel.

2. The method as recited in claim 1, further comprising positioning said third and fourth annular elements concentrically with, and outboard to said first and second annular elements located therebetween.

3. A method for providing a drive wheel for centerless drive of an annular saw blade of a cutting machine, said method comprising:
providing first and second annular elements, each of said annular elements having a first, beveled side surface located radially outward from a second side surface, said second side surfaces of the first annular element and the second annular element being in contact with one another and said first beveled side surfaces of the first annular element and the second annular element together defining a wedge-shaped drive groove for an inner edge of an annular saw blade to be driven by the drive wheel, said first and second annular elements being formed of a highly wear-resistant material selected from the group consisting of sintered carbide, ceramic material, and cold-forged steel;
wherein said first beveled surfaces are coated with a wear resistant material;
providing third and fourth annular elements configured to inwardly compress upon said first and second annular elements;
providing an anti-relative-rotation means for preventing relative rotation between said first, second, third, and fourth annular elements while driving an annular saw blade of a cutting machine; and
assembling the drive wheel with said anti-relative-rotation means interconnected between said first and second annular elements.

4. The method as recited in claim 3, further comprising positioning said third and fourth annular elements concentrically with, and outboard to said first and second annular elements located therebetween.

5. The method as recited in claim 3, wherein said anti-relative-rotation means is an anti-relative-rotation member interconnecting said first and second annular elements when driving an annular saw blade of a cutting machine with the assembled drive wheel.

6. A method for providing a drive wheel for centerless drive of an annular saw blade of a cutting machine, said method comprising:
providing first and second annular elements, each of said annular elements having a first, beveled side surface located radially outward from a second side surface, said second side surfaces of the first annular element and the second annular element being in contact with one another and said first beveled side surfaces of the first annular element and the second annular element together defining a wedge-shaped drive groove for an inner edge of an annular saw blade to be driven by the drive wheel, said first and second annular elements being formed of a highly wear-resistant material selected from the group consisting of sintered carbide, ceramic material, and cold-forged steel;
wherein said first beveled surfaces are coated with a wear resistant material;
providing third and fourth annular elements configured to inwardly compress upon said first and second annular elements;
assembling the drive wheel with said third and fourth annular elements arranged concentrically with and outboard to said first and second annular elements located therebetween; and
providing an anti-relative-rotation means for preventing relative rotation between said first, second, third, and fourth annular elements.

7. The method as recited in claim 6, further comprising:
interconnecting an anti-relative-rotation member between said first and second annular elements thereby preventing relative rotation between said first and second annular elements when driving an annular saw blade of a cutting machine with the assembled drive wheel.

8. A method for providing a drive wheel that rotates about a center of rotation for centerless drive of an annular saw blade in a cutting machine and which has two first, annular, beveled surfaces that define between themselves a wedge-shaped drive-groove for accepting an inner edge of the saw blade therein, said method comprising:
providing first and second annular elements each having a first annular beveled surface and a second annular surface axially inside of said first beveled surface, said first and second annular elements being formed of a highly wear-resistant material selected from the group consisting of sintered carbide, ceramic material, and cold-forged steel;
wherein said first beveled surfaces are coated with a wear resistant material;
arranging said first and second annular elements in a pair in which each is concentric with the other and said second annular surfaces of the first annular element and the second annular element are in snug contact with each other and said first annular beveled surfaces of the first annular element and the second annular element define between themselves the wedge-shaped drive-groove and are respectively positionable on a side of the inner edge of a saw blade for frictional contact therewith;

arranging a third and a fourth annular element concentrically with the first and second annular elements and one each being located on either side of paired first and second annular elements for compression thereupon in an axial direction; and providing an anti-relative-rotation means for preventing relative rotation between said first, second, third, and fourth annular elements.

9. The method as recited in claim 8, wherein said wear resistant material is selected from the group consisting of a carbide compound and a nitride compound.

10. The method as recited in claim 8, wherein said wear resistant material is selected from the group consisting of titanium carbide and titanium nitride.

11. The method as recited in claim 8, wherein said first and second annular elements each further comprises a third annular surface axially positioned inside said annular surfaces, said third annular surfaces defining a narrow recess therebetween that extends in a radial direction inward into the drive wheel.

12. The method as recited in claim 11, wherein said narrow recess has substantially flat sidewalls and has a depth between one-half and one and one-half times a radial depth of the wedge-shaped drive-groove.

13. The method as recited in claim 8, wherein said anti-relative-rotation means comprises a member that extends in an axial direction through a recess in said first and second annular elements at a location radially inward of the wedge-shaped drive-groove.

14. The method as recited in claim 8, wherein said anti-relative-rotation means comprises a member that extends in an axial direction through apertures in said first and second annular elements at a location radially inward of the wedge-shaped drive-groove.

15. The method as recited in claim 14, wherein said anti-relative-rotation member extends in the axial direction through apertures in said third and fourth annular elements at a location radially inward of the wedge-shaped drive-groove.

16. The method as recited in claim 15, wherein said anti-relative-rotation member is one of a solid pin and a hollow tube.

* * * * *